Patented Apr. 26, 1932

1,855,626

UNITED STATES PATENT OFFICE

GLENN DAVIDSON AND IRVING F. LAUCKS, OF SEATTLE, WASHINGTON, ASSIGNORS TO I. F. LAUCKS INC., OF SEATTLE, WASHINGTON, A CORPORATION OF WASHINGTON

PROCESS OF MAKING A WATER RESISTANT VEGETABLE PROTEIN CONTAINING ADHESIVE AND TO THE PRODUCT THEREOF

No Drawing.   Application filed January 3, 1928. Serial No. 244,368.

Our invention relates to the process of making a water resistant vegetable protein containing adhesive and to the product thereof. More particularly, our invention relates to the addition of a phenol to dispersed vegetable proteins and vegetable protein containing materials, which additions have the effect of improving the working properties and increasing the strength and water resistance of the resulting adhesive.

The art of making a water-proof glue from certain protein materials has been known for some time: thus casein and blood albumin are in common use. These last mentioned compounds, however, have a number of disadvantages from a practical standpoint. Casein is costly and lack of uniformity in the material as derived from various sources is a serious detriment; while blood albumin is not available except in certain situations. There is accordingly a great demand, particularly in the veneer industry where large quantities of glue are consumed, for a new glue that will be cheap and at the same time sufficiently water-proof.

By water-proof, in this connection, it is not meant that glues thus characterized will resist the action of water indefinitely, but it is meant that they are water-proof in the sense in which the term is used in the veneer industry, viz., that a panel can be soaked in cold water for from seventy-two to one hundred hours, or in boiling water for eight hours, without separation.

We have discovered, however, that by subjecting the same to proper treatment, such vegetable proteins or vegetable matter containing proteins can be converted into a waterproof glue that will satisfy the rigid requirements of veneer making. The requisite raw material may be derived from a number of sources and by proper treatment of such material we are able to produce a satisfactory glue at a much lower cost than has heretofore been possible.

To the accomplishment of the foregoing and related ends, the invention, then, consists of the combination of ingredients or composition of matter and the steps involved in the preparation of such composition hereinafter fully described and particularly pointed out in the claims, it being understood that such disclosed ingredients and steps constitute but several of the various ways in which the principle of the invention may be used.

We have found that soya bean flour constitutes an admirable raw material for our purpose. Such flour is preferably made by grinding soya bean cake so that eighty percent will pass a 100 mesh screen and when treated with certain chemicals, or other substances, we make therefrom a very satisfactory glue that meets the requirements of the veneer trade fully and is in many respects better than the usual glues now on the market. Such bean cake, as analyzed by us, is found to contain on the average forty five percent protein, twelve percent water, five percent cellulose or crude fiber, seven percent oil, six percent ash, and twenty-five percent carbohydrates.

We do not, however, wish to limit ourselves to soya bean flour or to vegetable protein derived from this source for we have made satisfactory glue by our improved process from a low grade wheat containing approximately ten percent protein and there are many other vegetable materials containing protein in amounts intermediate between the percentages thus noted as found in such soya bean flour and wheat or even slightly lower than the percentage in such wheat that may be utilized with satisfactory results.

Soya bean flour made from soya bean cake from which the oil has been expressed is preferably used in practice because it is cheaper and makes a better glue, but flour made from whole soya beans, without expressing the contained oil, may also be used, although obviously this would not be economical in view of the value of the oil. As to the fineness of the flour, it is not necessary that the meal be ground as fine as indicated above, but fineness is desirable from a practical standpoint.

When the usual chemicals employed in making casein glue, viz., lime and sodium silicate, are added to a vegetable protein-containing materal, for example, soya bean flour, a glue results, but it is not as good as casein glue. It is not as highly water resistant nor as workable. We find, however, by the use of caustic soda with such vegetable protein-containing matter, a much better glue is obtained, such caustic soda apparently playing the part of dispersing the colloidal material. The resultant glue is then somewhat similar in its working properties to casein glue, although its water resistance is still slightly less.

Preferably we react on our vegetable protein-containing material with both caustic soda and lime. As equivalents of such caustic soda, caustic potash and ammonia may be used, although more expensive. Other equivalents of caustic soda are salts of soda (or potash) with weak acids, e. g., sodium phosphate, sodium borate and the like. Similarly in place of lime, magnesia, baryta and strontia may be used as equivalents.

In order to improve the working properties, e. g. the spreading and flow, of the glue produced as aforesaid as well as the water resisting properties, we have found it desirable to add other substances of which the following are examples:

Copper sulfate, cuprammonium compounds, copper-caustic soda compounds,— equivalents would be other alkaline compounds of copper; sodium dichromate,— equivalents would be other metallic dichromates or chromates; chrome alum, ammonia alum, aluminum sulfate,—equivalents would be other alums and aluminum salts, including aluminates, (Portland cement which has a certain calcium aluminate content has been listed under silicates, but the aluminate undoubtedly has effect); quebracho, sumach, spruce extract (concentrated sulfite liquor), all being commonly used tanning agents,— equivalents would be other vegetable tanning agents; zinc sulfate, zinc chloride, ammonium zincate,—equivalents would be other zinc compounds; calcium sulfate, calcium oxychloride (bleaching powder),—equivalents would be other calcium salts, or alkaline earth salts; cresylic acid,—equivalents would be other phenols; sodium silicate, calcium silicate in the form of Portland cement,— equivalents would be other metallic silicates or other hydraulic cements, as well as kaolin or china clay, which, of course, is a metallic silicate; and rosin, sodium or calcium soaps of rosin,—equivalents would be other resins or resin combinations with metals.

All of the compounds just listed have been actually used by us. In general we may say that copper salts and the dichromates make the glue more readily workable while at the same time imparting water resistance; that the alums, the tanning agents, zinc compounds, calcium compounds and cresylic acid increase the water resistance of the glue; that the silicates and related compounds act as thinners while at the same time increasing the water resistance and strength of the glue; and that resin and derivatives thereof act as thinners and make the glue more readily workable.

We have also found that certain substances will act in the same way as the caustic soda and also as thinners, e. g. sodium phosphate, sodium perborate and sodium sulphite. These salts are all related in that they are combinations of the strong base sodium with a weak acid and there are a number of other salts that fall in the same category and which have a similar effect, so need not be listed in detail.

As an example, we may cite the following formula for producing our adhesive: Mix 30 parts soya bean flour, 5 parts rosin, 1½ parts copper sulphate, ½ part sodium dichromate, 90 parts water, 1 part cresylic acid, 26 parts 18% caustic soda solution, 6 parts calcium hydrate in 15 parts water, 15 parts water glass.

The particular order in which the several ingredients are admixed together in the formula just given may be varied, and it is not necessary that the manufacture of the product be completed in a single continuous operation, but as a matter of practice we have found it desirable in certain cases to mix only certain of the ingredients initially and then add the others just before the glue is required for use.

It will also be understood, of course, that the foregoing formula is typical and that many variations are actually made therein in the compounding of our improved glue.

The above is divisional from application Serial #671,381, filed Oct. 29, 1923, by Irving F. Laucks and Glenn Davidson, applicants herein.

Further experimentation has resulted in confirming previous test results and the importance of our discovery. For example, in the manufacture of adhesives from vegetable protein containing materials we may illustrate with a formula embodying soya bean flour which is one of our commercial formulæ for adhesive suitable for use in the manufacture of high grade plywood.

A dry powdered mixture of soya bean flour and other ingredients is made up first in proportions, for instance of soya bean flour 1052 parts; calcium hydrate 189 parts; powdered rosin 56 parts; potassium permanganate 5 parts; and sodium fluoride 158 parts. These ingredients are thoroughly mixed and form a dry powdered vegetable protein containing adhesive ready to be mixed with water and applied in the manufacture of plywood.

In illustration of the effect of phenols upon adhesives embodying vegetable protein containing material, such as the one described above, we may use commercial cresol.

We may designate the above described mixture of vegetable protein containing material and other dry powdered ingredients and also other similarly compounded dry mixtures as "powdered adhesive" in further describing our invention.

In further preparation of the adhesive for use on plywood the powdered adhesive is mixed with water in a suitable mixing device. The ingredient, i. e., one of the phenols, having the effect of improving the working properties and increasing the strength and water resistance of the resultant adhesive, is added. This mixture is then further mixed, after which it is ready for application to plywood.

For comparison purposes, to illustrate the advantage of using a phenol, we then prepare an adhesive batch A without a phenol, and a batch B, identical with batch A but with a phenol added. For example:

A. Place 950 parts of water in suitable mixing device; add 415 parts of powdered adhesive, stir 25 minutes; add 400 parts of water and stir five minutes. The adhesive is now ready for application to plywood or other material to be glued.

B. Same as A except add also 10 parts of commercial cresol.

These manufactured adhesives A and B were spread upon plywood using in one case fir and in a second case birch. The dry joint strengths were obtained expressed in pounds tensile strength per square inch of joint surface. Also the joint strengths were obtained after test pieces had been soaked in water for forty-eight hours and expressed in the same terms as the dry joint strength.

All conditions of temperature, pressure, time, of assembly of plywood, etc. were the same in all tests.

Results of tests were as follows:

|   | Dry strength using— | | Strength after soaking 48 hours using— | |
|---|---|---|---|---|
|   | Fir | Birch | Fir | Birch |
| A | 167 | 217 | 100 | 13 |
| B | 260 | 315 | 163 | 107 |

In each case it will be noted that not only is the dry adhesive strength increased in B over A, but the adhesive strength after soaking forty-eight hours is very markedly increased, in the test on birch particularly.

Beta-napthol has properties very similar to those of phenols and for the purposes and uses herein set forth is held as an equivalent.

As an example of such use we may cite Test C which may be compared with results of Test A on birch. In Test C, ten parts of beta-napthol were added immediately before the final stirring, all other conditions being the same as in Test A.

Results of test:

|   | Dry strength using birch | Strength after soaking 48 hours using birch |
|---|---|---|
| A | 217 | 13 |
| C | 246 | 100 |

Similar experiments using other vegetable protein containing materials such as peanut flour, cottonseed flour, linseed flour, etc. indicated improvement in the working properties of the adhesives and marked increase in strength of same as the result of additions of commercial phenol and commercial cresol. For example, use of commercial cresol increased the adhesive strength of a glue as much as fifty percent, the adhesive being made up in the same manner as for Tests A and B except that linseed flour was used instead of soya bean flour.

In further exemplification of the scope of our invention we may cite examples of the increased strength and water resistance developed in adhesives adapted for sizing of cellulose fibre products.

In general, there are known to the art: engine size, i. e., where the adhesive forms a coating for every fibre, which sizing is added to the paper during the process of its manufacture; second, surface size, which constitutes a coating for the surface to produce paper, especially fine surface paper, as for high grade writing stationery; and, third, surface coat, i. e., a mixture of adhesive and pigment for fine half tones and book paper and also for strengthening and waterproofing fabrics and paper. For example, it may be used in conjunction with talc, kaolin, whiting, blanc fixe, and the like to form coatings having a high gloss and water resistant properties and also it may be used with mineral oils, asphalt and fatty oils to produce coatings for fabrics and paper having elastic properties, flexibility, increased strength, and great water resistance.

Our product may be used for all these various types of sizes, i. e., for engine size, i. e., the adhesive (size) used to bind pigment to the surface of the paper in the manufacture of coated paper. In commercial practice, the term "size" is used interchangeably to designate the adhesive used in all the above instances, and it is in this way that the term is used in this application.

For purposes of this disclosure we define the term "size" to include all uses given hereinabove. In short, we make no distinction between the terms "size" and "coating" so far as the applicability of our adhesive is concerned, and whenever the term "size" is used in this application it is to be expressly understood that it may also include (wheresoever the context permits) what is commercially known or referred to as "coatings".

Furthermore, our improved size may be used to impart the properties of stiffness and water resistance to cellulose, cotton or linen fabrics, as well as to increase their gloss or lustre; it also may be used to impart water resistance and at the same time maintain pliability, the stiffness or pliability being in the main regulated by the pigment chosen.

By "pigment" we mean, in this application, any material other than the protein adhesive bound to the cellulose fibre product including such materials as clay, kaolin, whiting, blanc fixe, and the like; asphalt, mineral and fatty oils and rosin.

We have discovered that when phenols are added to dispersed vegetable protein flour, in the process of manufacture of size for cellulose fibre products embodying the size, the strength and water resisting properties are increased to a very marked extent.

By the term "phenols" as used herein we mean to include cyclic compounds of the aromatic or benzene series containing an hydroxyl group.

The following examples will illustrate the extraordinary and remarkable results obtained by us through the use of our discovery.

The test we use for evaluating the adhesive strength of a size when used in conjunction with a pigment in the manufacture of coated papers, for instance, is a modified form of the "surface pick test" which is well known to the trade and described in the literature. The "surface pick test" consists in a test of the amount of the paper coating picked by a composition roller inked with a tacky ink,—the test being made as a comparison between a standard piece of coated paper and the sample to be tested.

It is of very material advantage to be able to give to each sample a numerical value. This is accomplished by preparing a series of standards by making pick tests on pieces of coated papers containing varying amounts or proportions of adhesive or size, so that the results obtained range from very poor to practically perfect, that is, from a paper so poorly coated that a very large proportion of the coating is removed by the ink roller, to a coated paper of such high standard that practically none of the coating is removed by the roller.

It is necessary, therefore, in order to use this standard, to give numerical values to the results obtained and to most carefully control all the conditions under which the test is made, as for instance; the amount of ink carried on the roller, the pressure used on the roller, and the number of times the roller is carried over the test piece.

Similarly, the water resistance of such a cellulose fibre product as coated or surface sized paper is evaluated numerically by means of a test operated as follows:

The surface of a sample of coated paper is wetted and rubbed with a brush under standard conditions until the coating is removed. We have found a camel's hair brush with the bristles cut short is best for this purpose. The pressure on the brush and angle at which it contacts the paper and the length of the stroke are kept constant by a suitable mechanical device. One cubic centimeter of water is run onto the surface to be tested and rubbing started. The point at which the brush first begins to roll up the fibers of the paper, which occurs as soon as the coating or surface sizing is removed, is taken as the end point of the test. The number of strokes of the brush required to reach the end point is taken as the numerical value of the water resistance of the sample tested. Having thus outlined the method of testing the strength and water resistance used in the manufacture of cellulose fibre products, and the strength and water resistance of cellulose fibre products embodying adhesives, we may cite examples to show results obtained by the use of our invention.

In illustration of a cellulose fibre produce embodying a vegetable protein adhesive we may coat paper with English coating clay and use soya bean flour as representative vegetable protein containing material in the manufacture of the adhesive. The clay mix is made by mixing together 100 parts of English coating clay and 70 parts of water. This is allowed to stand at least twenty-four hours before use. The adhesive mix may be made by mixing 100 parts of soya bean flour with 450 parts of water in a suitable device. 50 parts of 10% solution of caustic soda is added, and 5 parts of phenols is added, the mixture is further agitated, and then heated on a water bath to 150° F. and then cooled. The clay mix and adhesive mix are then mixed in suitable proportions and are ready for application to the paper.

The test results given below, in exemplification of the material benefits to be derived as a result of our discovery of the effect of treatment with a phenol, using the same procedure as to methods of tests, formula for clay mix, adhesive mix, coating mix, etc. with the sole exception of the amount of phenols added.

Test "A—1". No phenols added.
Test "A—2". 5 parts commercial cresol added.
Test "A—3". 7½ parts commercial cresol added.
Test "A—4". 5 parts beta-naphthol.
Test "A—5". 7½ parts beta-naphthol.

Results

| | Strength | Water resistance |
|---|---|---|
| A—1 | 18 | 45 |
| A—2 | 37 | 125 |
| A—3 | 36 | 145 |
| A—4 | 24 | 170 |
| A—5 | 26 | 179 |

The remarkable increase in strength and water resistance due to the embodiment of phenols in the adhesive is very apparent, in no case being less than thirty-three and one-third per cent.

Whenever the terms "vegetable seed flour", "soya bean flour", etc., are used herein, we mean flour resulting from the grinding of vegetable seeds or the residues resulting after the removal from said seeds of the oil content in whole or in part, by whatever means.

We claim:—

1. In the method of making a water resistant, vegetable protein containing adhesive, the step which consists in adding a phenol to vegetable seed flour dispersed in an alkaline, aqueous medium, in which the proportion of water to the vegetable seed flour is not less than two to one, said phenol acting to increase the water resistance of the adhesive.

2. In the method of making a water resistant, vegetable protein containing adhesive, the step which consists in adding a phenol to soya bean flour dispersed in an alkaline, aqueous medium, in which the proportion of water to the soya bean flour is not less than two to one, said phenol acting to increase the water resistance of the adhesive.

3. In the method of making a water resistant, vegetable protein containing adhesive, the step which consists in adding a phenol to vegetable seed flour dispersed in an alkaline, aqueous medium containing lime, in which the proportion of water to the vegetable seed flour is not less than two to one, said phenol acting to increase the water resistance of the adhesive.

4. In the method of making a water resistant, vegetable protein containing adhesive, the step which consists in adding a phenol to soya bean flour dispersed in an alkaline, aqueous, medium containing lime, in which the proportion of water to the soya bean flour is not less than two to one, said phenol acting to increase the water resistance of the adhesive.

5. A water resistant adhesive, embodying the reaction product of vegetable seed flour of considerable protein content; and a phenol, the whole being in aqueous, alkaline medium in which the proportion of water to vegetable seed flour is not less than two to one, said phenol acting to increase the water resistance of the resultant adhesive.

6. A water resistant adhesive, embodying the reaction product of soya bean flour; and a phenol, the whole being in aqueous, alkaline medium in which the proportion of water to soya bean flour is not less than two to one, said phenol acting to increase the water resistance of the resultant adhesive.

7. A water resistant adhesive embodying the reaction product of vegetable seed flour of considerable protein content; and a phenol, the whole being dispersed in an alkaline, aqueous medium containing lime, in which the proportion of water to the vegetable seed flour is not less than two to one.

8. A water resistant adhesive embodying the reaction product of soya bean flour of considerable protein content; and a phenol, the whole being dispersed in an alkaline, aqueous medium containing lime, in which the proportion of water to the soya bean flour is not less than two to one.

In witness whereof we hereunto subscribe our names this 22d day of December, 1927, and this 16th day of December, 1927, respectively.

GLENN DAVIDSON.
IRVING F. LAUCKS.